United States Patent
Steele et al.

(10) Patent No.: US 10,955,077 B2
(45) Date of Patent: Mar. 23, 2021

(54) ROTATING SNAP CONNECTION ASSEMBLY

(71) Applicant: NORDSON CORPORATION, Westlake, OH (US)

(72) Inventors: Kyle R. Steele, Windsor, CO (US); Peter D. Lewis, Loveland, CO (US)

(73) Assignee: Nordson Corporation, Westlake, OH (US)

( * ) Notice: Subject to any disclaimer, the term of this patent is extended or adjusted under 35 U.S.C. 154(b) by 463 days.

(21) Appl. No.: 15/405,575

(22) Filed: Jan. 13, 2017

(65) Prior Publication Data

US 2017/0205005 A1 Jul. 20, 2017

Related U.S. Application Data

(60) Provisional application No. 62/280,476, filed on Jan. 19, 2016.

(51) Int. Cl.
| | |
|---|---|
| *F16L 27/08* | (2006.01) |
| *F16L 47/18* | (2006.01) |
| *F16L 37/098* | (2006.01) |
| *F16L 41/00* | (2006.01) |
| *F16L 41/03* | (2006.01) |
| *F16L 47/06* | (2006.01) |

(52) U.S. Cl.
CPC ......... *F16L 27/0845* (2013.01); *F16L 37/098* (2013.01); *F16L 41/007* (2013.01); *F16L 41/03* (2013.01); *F16L 47/18* (2013.01); *F16L 27/082* (2013.01); *F16L 47/06* (2013.01)

(58) Field of Classification Search
CPC ... F16L 27/0845; F16L 27/0804; F16L 41/03; F16L 41/007; F16L 47/18; F16L 37/098; F16L 37/0985

USPC .......... 285/127.1, 133.11, 132.1, 133.3, 239, 285/272, 273, 275, 278, 280, 921
See application file for complete search history.

(56) References Cited

U.S. PATENT DOCUMENTS

| | | | | |
|---|---|---|---|---|
| 4,648,628 | A * | 3/1987 | Meadows | 285/133.11 |
| 4,770,445 | A | 9/1988 | Steer et al. | |
| 4,946,204 | A * | 8/1990 | Boticki | 285/921 X |
| 5,628,532 | A * | 5/1997 | Ashcraft | |
| 6,540,261 | B1 * | 4/2003 | Painter | 285/133.11 |
| 8,333,410 | B2 * | 12/2012 | Boticki | F16L 37/0985 285/127.1 |
| 2002/0096880 | A1 * | 7/2002 | Schulz | 285/133.11 |

(Continued)

OTHER PUBLICATIONS

European Patent Application No. 17151867.3: Extended European Search Report dated Jun. 14, 2017, 9 pages.

*Primary Examiner* — Zachary T Dragicevich
(74) *Attorney, Agent, or Firm* — Baker & Hostetler LLP (57) ABSTRACT

A connector provides a rotating snap connection for connecting tubes, hoses and/or other conduits where the rotatable portion of the connector snap fits with the remaining portion of the connector. A first connector can include a body defining a first internal passage, a connecting end defining a second internal passage, and a connecting mechanism rotatably connecting the connecting end to the body such that the second internal passage of the connecting end is fluidly connected with the first internal passage. A second connector can include a first body, a second body rotatably connected to the first body via a connecting structure, and a connecting structure.

20 Claims, 8 Drawing Sheets

(56) References Cited

U.S. PATENT DOCUMENTS

2007/0215147 A1    9/2007  Ho
2008/0093846 A1*  4/2008  Sparks .................. F16L 37/098
2010/0194106 A1    8/2010  Mayr
2015/0145240 A1*  5/2015  Kujawski ................ F16L 41/03

* cited by examiner

ROTATING SNAP CONNECTION ASSEMBLY

CROSS REFERENCE TO RELATED APPLICATIONS

This application claims the benefit of U.S. Provisional Patent App. No. 62/280,476, filed Jan. 19, 2016, which is incorporated by reference herein in its entirety.

TECHNICAL FIELD

The present disclosure relates generally to connectors for tubes or hoses. More particularly, the present disclosure relates to a connector assembly having multiple connecting ends where at least one end is rotatable with respect to the other connecting ends and the rotatable end is connected by a snap fit connection.

BACKGROUND

Connectors are used for making connections with tubes, hoses and/or conduits. Due to the variety of uses and settings where conduits may be used, it may be desirable to adapt the connector to connect various conduits coming to the connector at various orientations.

Accordingly, it is desirable to provide an apparatus that can be moved or adjusted in order to connect to various conduits attaching to the connector at various orientations.

SUMMARY

A connector includes a body defining a first internal passage, a connecting end defining a second internal passage, and a connecting mechanism rotatably connecting the connecting end to the body such that the second internal passage of the connecting end is fluidly connected with the first internal passage. The connecting mechanism includes a retention groove defined by either the body or the connecting end, a retention projection defined by the other of the body or the connecting end that does not define the retention groove, and a sealing barb located on either the body or the connecting end and configured to be embedded in the other of the body and connecting end on which the sealing barb is not located. The retention projection fits within the retention groove to connect the connecting end with the body.

Implementations may include one or more of the following features. The body and the connecting end can be made of a resilient material and the retention projection can be inserted into the retention groove by a snap fit. The retention groove can be located on the connecting end and the retention projection can be located on the body. The sealing barb can be located on the connecting end.

The retention groove can be annular in shape and the retention projection can have an interrupted annulus shape. The connector can further include a stop surface located on one of the body and connecting end. The stop surface can be dimensioned to stop the body and the connecting end from moving closer with respect to each other when the retention projection is located in the retention groove.

The connecting end can include a second barb that is configured to attach to a hose. The connecting end can be configured to rotate 360 degrees with respect to the body. The sealing barb can be dimensioned so that the first internal passage of the body and the second internal passage are fluidly sealed by the sealing barb embedded in the other of the body and connecting end on which the sealing barb is not located without use of an elastomeric seal. The sealing barb, when embedded in the other of the body and connecting end on which the sealing barb is not located, can be proximate to an undercut or chamfered surface located on the other of the body and connecting end on which the sealing barb is not located. The sealing barb can define at least a portion of the retention groove. The body can include a second connecting end, where the connecting end and the second connecting end can define a barb configured to retain a hose.

In another aspect, a connector includes a first body, a second body rotatably connected to the first body via a connecting structure, and a connecting structure. The connecting structure includes a locking structure located on both the first and second bodies and configured to lock the first and second bodies together in a snap fit configuration, a first stop surface located on the first body, a second stop surface located on the second body, and a sealing barb located on the first body and embedded into corresponding geometry on the second body.

Implementations may include one or more of the following features. The connecting structure can include a retaining groove in one of the first and second bodies and a retaining projection located in the other of the first and second bodies not containing the retaining groove. The first body can be fastened to the second body via the retaining projection interlocking into the retaining groove. The retaining groove can be generally annular in shape and the retaining projection can be dimensioned to fit in the retaining groove.

The retaining projection can have an interrupted annulus shape. The first and second bodies can be made of resilient material so that the first and second bodies flex as the retaining projection is slid toward the retaining groove. Once the retaining projection is moved to the retaining groove, the retaining projection can snap into place into the retaining groove. The sealing barb and corresponding geometry on the second body can be dimensioned so that when the sealing barb is embedded into the corresponding geometry on the second body, the first and second bodies can be fluidly sealed with respect to each other without use of an elastomeric seal.

DETAILED DESCRIPTION

Various embodiments will now be described with reference to the drawing figures, in which like reference numerals refer to like parts throughout. An embodiment in accordance with the present disclosure provides a rotating snap connection for connecting tubes, hoses and/or other conduits where the rotatable portion of the connector snap fits with the remaining portion of the connector. The terms "hose" or "tube" should not be viewed as limiting but should be understood to mean any generic type of mechanical conduit.

Figure 1:
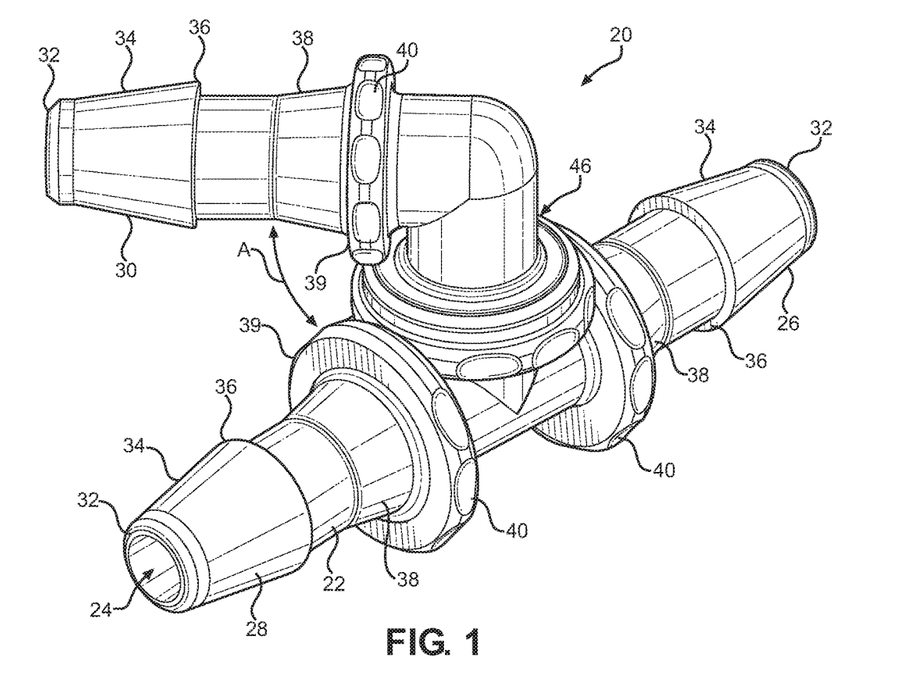
FIG. 1 is a perspective view illustrating a connector according to one embodiment.
Figure 2:
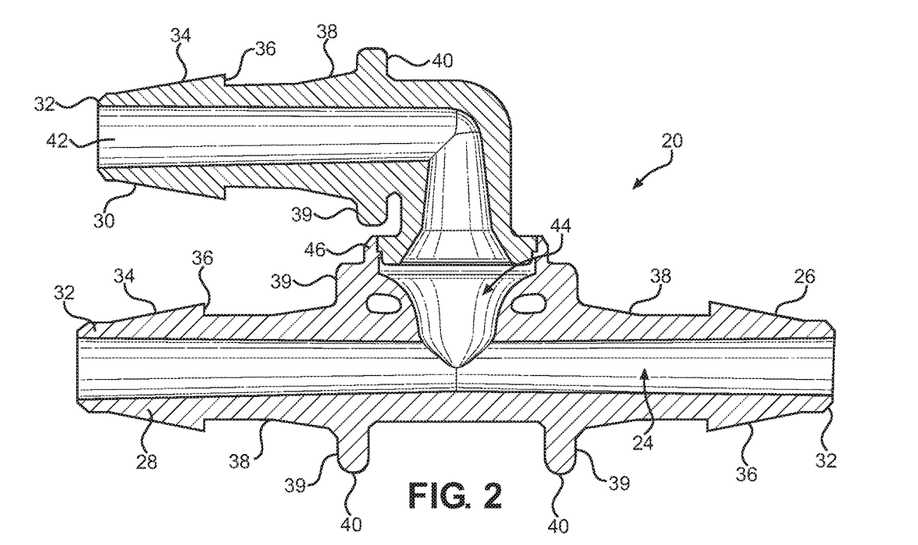
FIG. 2 is a cross-sectional of the connector shown in FIG. 1.

FIGS. 1 and 2 are perspective and cross-sectional views, respectively, of a connector 20 in accordance with an embodiment of the present disclosure. In the cross-sectional view shown in FIG. 2, a rotating portion of the connector 20 has been rotated to be in alignment with the remaining portion of the connector 20.

The connector 20 includes a body 22. The body 22 defines a first interior passageway 24 which is configured to allow fluid, whether a liquid or gas, to flow through the body 22. The connector 20 also includes a first connecting end 26, a second connecting end 28, and a third connecting end 30. One of ordinary skill the art will understand that connectors in accordance with the present disclosure may include more or fewer connecting ends then shown and described herein.

Each connecting end 26, 28, 30, may include a chamfered or curved surface 32 in order to facilitate the connecting ends 26, 28, 30 attaching to a tube or hose. The connecting ends 26, 28, 30, may also include a first inclined surface 34 and a barb 36. The barb 36 may be useful in retaining and/or sealing a tube or hose to the connector 20. The connecting ends 26, 28, 30, may also include a second inclined surface 38 that may allow the tube or hose, when connected to the connector 20, to be friction fit onto the connector 20. In some instances, once the second inclined surface 38 grows to be as wide as the tube or hose moving toward the end, 26, 28, or 30, the tube or hose will no longer fit onto the connector 20 and may stop. In other instances, a stop surface 39 may be provided in order to provide a hard stop for a tube or hose being connected to the connector 20. A gripping surface 40 may be provided around a circumference of the stop surface 39 to allow a user to grip the connector 20. In some embodiments, it may be useful to twist the connector 20 when attaching or detaching a tube or hose to the connecting ends 26, 28, 30.

In some embodiments, the connecting ends 26, 28 30 may include interior passageways 24 or 42. In the embodiment shown in FIGS. 1 and 2, a third connecting end 30 is rotatable with respect to the body 22 of the connector 20. The rotatable end 30 rotates with respect to the body 22 in the direction shown by arrow A in FIG. 1. The third connecting end 30 includes a second interior passageway 42 that is fluidly connected to the first interior passageway 24 via a merging area 44. As a result, all of the connecting ends 26, 28, 30 have interior passageways 24 and 42 that are fluidly connected.

Figure 3:
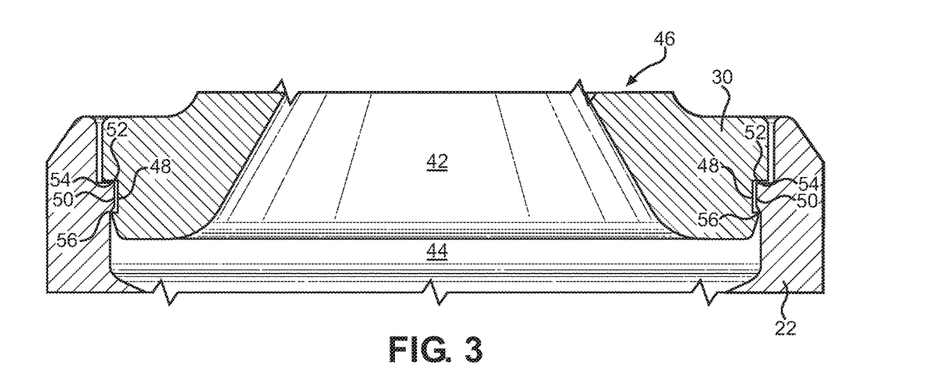
FIG. 3 is a partial, close-up, cross-sectional view of the connector shown in FIG. 2.

The third connecting end 30 attaches to the body 22 at a connecting area 46. FIG. 3 is a partially enlarged, cross-sectional view of the connecting area 46 of the connector 20. With reference to FIG. 3, the connecting area 46 includes a retention groove 48 defined in the third connecting end 30. A retention projection 50 is defined by the body 22. The retention projection 50 fits within the retention groove 48 in order to lock the third connecting end 30 to the body 22. It will be appreciated that the third connecting end 30 is generally circular in cross-section at the connecting area 46 as shown in FIG. 1. As such, the third connecting end 30 may be able to rotate 360° with respect to the body 22 while allowing the retention projection 50 to remain in the retention groove 48.

It should also be appreciated that both the retention groove 48 and the retention projection 50 are generally annular in shape. A side wall 52 of the retention groove 48 provides a stop surface and abuts a side wall 54 of the retention projection 50. In this manner, the retention projection 50 is trapped within the retention groove 48 thereby locking the third connecting end 30 to the body 22 while providing fluid communication between the second interior passageway 42 of the third connecting end 30 with the first interior passageway 24 of the body 22.

A sealing barb 56 is located on the third connecting end 30 and is embedded in the corresponding structure in the body 22. The sealing barb 56 can define an inner edge that faces towards the retention groove 48 and a tapered edge that tapers inwardly as it extends from the inner edge. The tapered edge can extend from the inner edge at an acute angle. The body 22 has corresponding structure having corresponding geometry to receive the sealing barb 56. The shape of the corresponding geometry may be simply a straight wall tube to receive the sealing barb 56. Alternatively, the corresponding geometry may include other preformed shapes to receive the sealing barb 56. The corresponding structure in the body 22 is compliant in receiving the sealing barb 56 to form a seal between the sealing barb 56 and the corresponding structure of the body 22. The fact that a sharp portion of the sealing barb 56 is embedded into the body 22 provides a fluid tight seal between the third connecting end 30 and the body 22. The sealing barb 56 obviates the need for any other types of seals such as elastomeric seals. However, in some embodiments, elastomeric seals may also be used but they may not be required in many embodiments. It will be appreciated that the sealing barb 56 is also annular in shape and may engage the body 22 in an annular shaped contact area.

Figure 4:
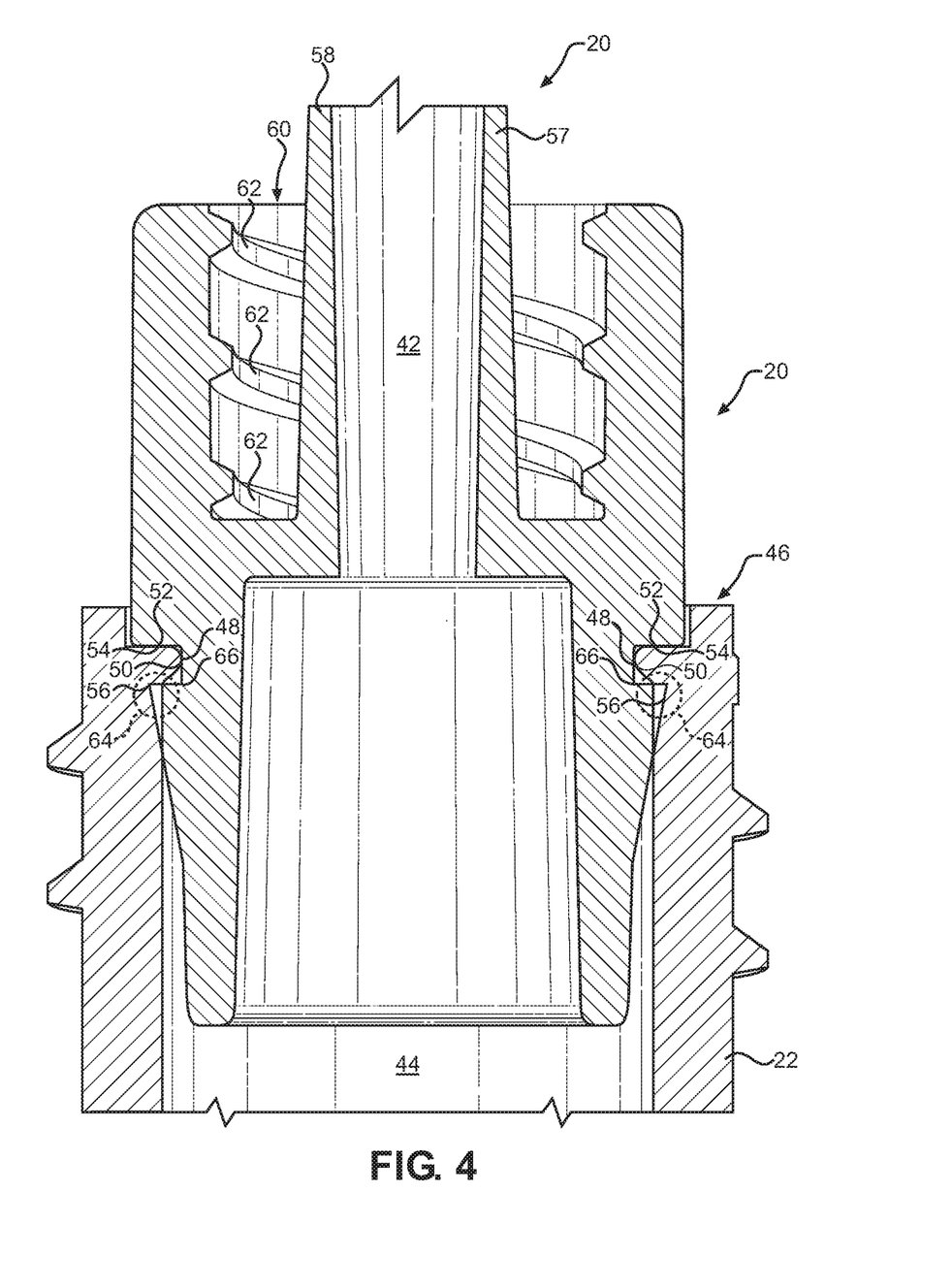
FIG. 4 is a partial, cross-sectional view of another connector in accordance with another embodiment.

FIG. 4 is a partial, cross-sectional view of an alternate connector 20. The alternate connector 20 may include a rotating end 57 which includes a connecting nozzle 58 configured to receive a tube or hose. The connecting nozzle 58 may be located in a connecting hole 60 in which connecting threads 62 may be located. The connecting threads 62 may threadably engage the connector 20 with a tube or hose connected to the alternative connector fitting 71.

The rotating end 57 connects to the body 22 in a manner similarly described above with respect to FIGS. 1-3. The second interior passageway 42 is fluidly connected to a first interior passageway 24 in the body 22 via a merge area 44. The connecting area 46 includes a retention groove 48 located in the rotating end 57. A retention projection 50 is located in the rotating end 57. A side wall 52 of the retention groove 48 interacts with the side wall 54 of the retention projection 50 in order to retain the retention projection 50 into the retention groove 48. In this manner, the rotating end 57 is mechanically fastened to the body 22 in a manner that allows the rotating end 57 to rotate axially with respect to the body 22.

In both embodiments shown in FIGS. 1-3, and FIG. 4, the sealing barb 56 not only provides a sealing function to seal the first interior passageway 24 with the second interior passageway 42 by embedding into the body 22, but the sealing barb 56 may also define, at least in part, the retention groove 48 and help to retain the retention projection 50 within the retention groove 48. Interference area 64 illustrates a portion of the sealing barb 56 embedded into the body 22 in order to provide a sealing function. The interference area 64 is referred to as an interference area because that is where the sealing barb 56 and the body 22 are connected and/or sealed by an interference fit. As the sealing barb 56 embeds into the body 22, it also mechanically attaches the body 22 with the connecting end 30 or 57.

An undercut, chamfer, or inclined area 66 may be provided on the retention projection 50 as shown in both FIGS. 3 and 4. This undercut, chamfer, or inclined area 66 may be useful during assembly and/or disassembly of the connector 20.

The body 22 and third end 30 or rotating end 57 may be made of a resilient material that will flex such as, for example plastic. In some embodiments, the connector 20 may be made of polymers. For example, the connector 20 may be made of any of the following: polypropylene, acrylonitrile butadiene styrene (ABS), nylon, polyethylene, polycarbonate, high-density polyethylene (HDPE), or acetal. It should be understood that the foregoing list is meant to be examples only and is in no way limiting of suitable materials that may be used for the connector 20 in various embodiments.

When the third connecting end 30 or rotating end 57 is being inserted into the body 22, both the body 22 and the connecting end 30 or 57 may flex until the retention projection 50 snaps into the retention groove 48. About at the position where the retention projection 50 snaps into the retention groove 48, the sealing barb 56 will embed itself into the body 22. In this position, the side wall 52 of the retention groove 48 will act as a positive stop and prevent the retention projection 50 from moving further into the body 22.

While various features such as the retention groove 48 and sealing barb 56 have been attributed to either the third end 30 or the rotating end 57 and the retention projection 50 and corresponding structure of the body 22 for receiving the sealing barb 56 have been attributed to specifically the body 22, it will be appreciated that these features may be reversed. Optionally, the body 22 may define a retention groove 48 and a retention projection 50 and the sealing barb 56 may be found on the body 22. A mere reversal or rearrangement of position of various parts will still fall within what is contemplated by the present disclosure.

Figure 5:
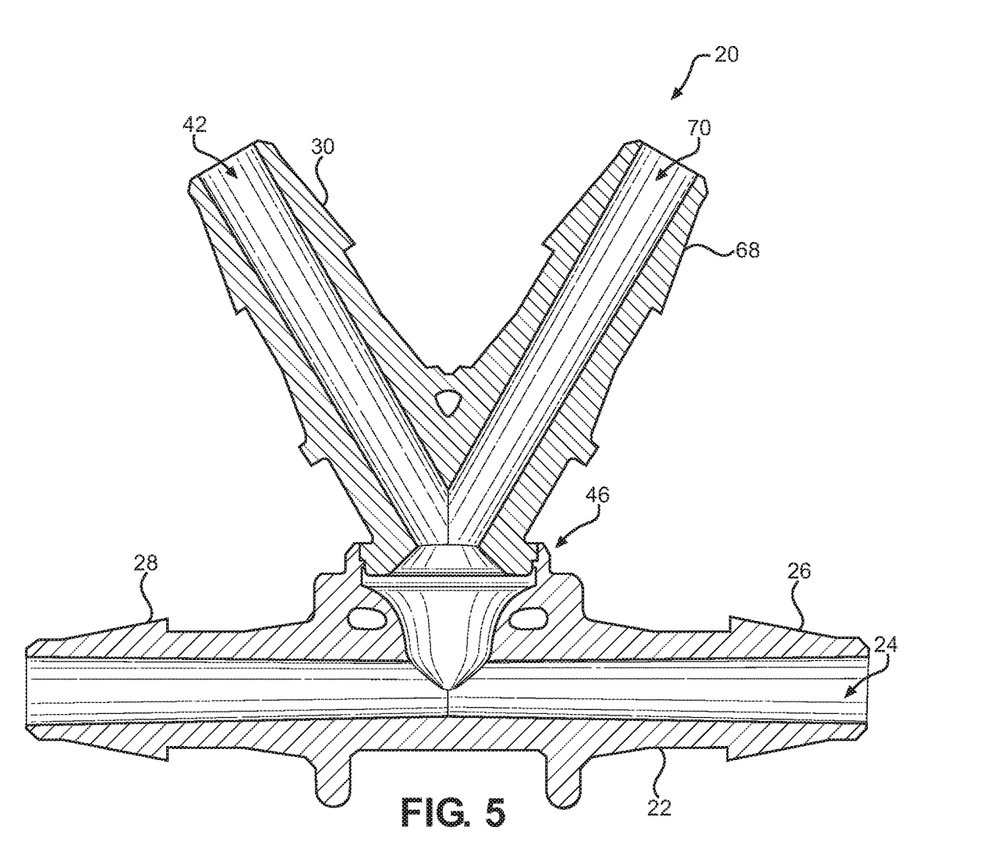
FIG. 5 is a cross-sectional view of another connector in accordance with another embodiment.

FIG. 5 is a cross-sectional view of another connector 20 in accordance of the present disclosure. The connector 20 shown in FIG. 5 includes a first connecting end 26, a second connecting end 28, a third connecting end 30, and a fourth connecting end 68. Interior passageways 24, 42, and 70 are all fluidly connected. The third connecting end 30 and fourth connecting end 68 are integral with each other and both the rotate and are connected to the body 22 at the connecting area 46. The connecting area 46 has connecting and sealing structure similar to that described above with respect to FIGS. 1-3 and 4.

Figure 6:
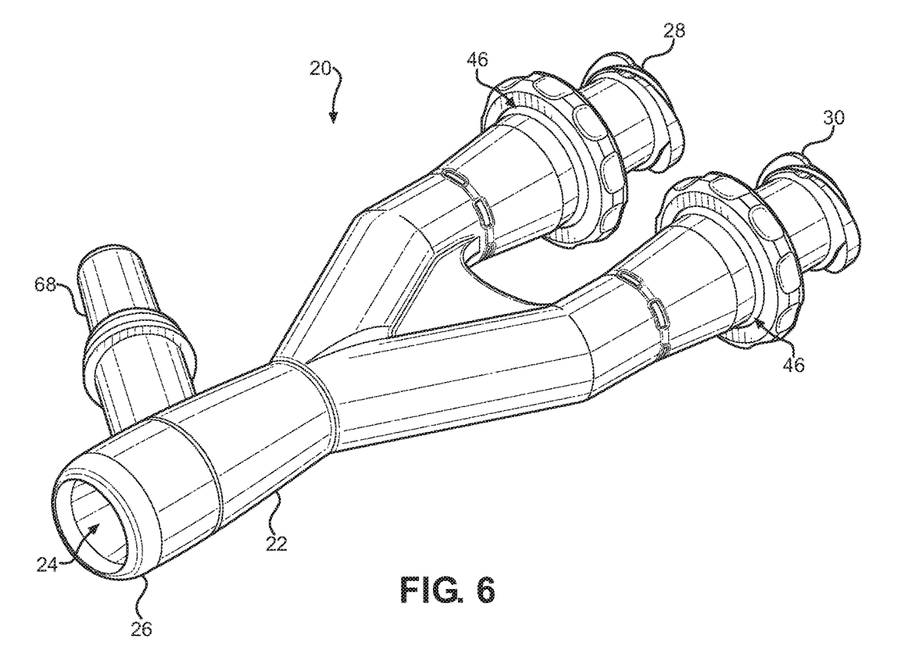
FIG. 6 is a perspective view of another connector in accordance with another embodiment.
Figure 7:
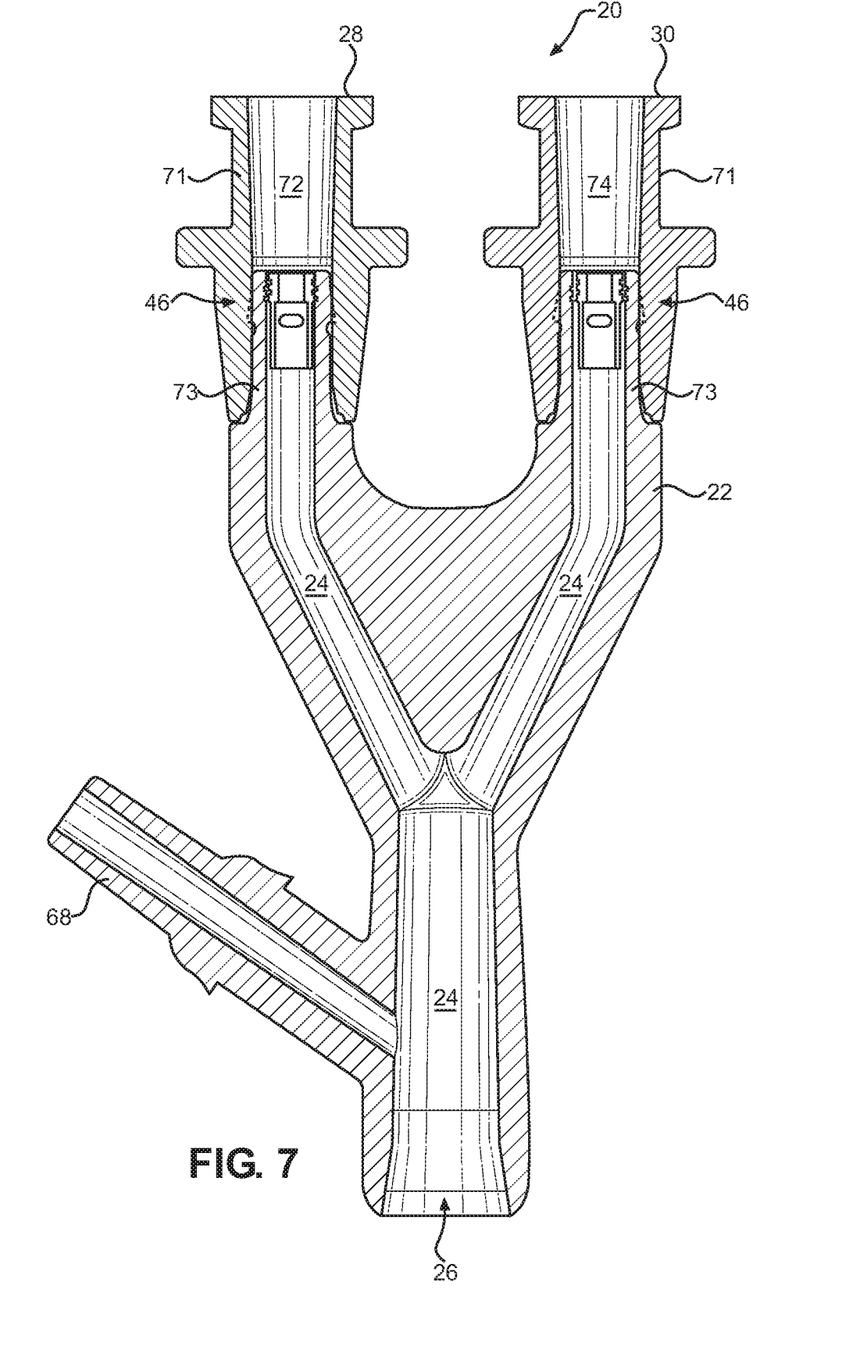
FIG. 7 is a cross-sectional view of the connector shown in FIG. 6.

FIGS. 6 through 10 illustrate another embodiment in accordance with the current disclosure. FIGS. 6 and 7 are perspective and cross-sectional views of an alternative type of connector 20. The connector 20 includes a body 22 having a first interior passageway 24, a first connecting end 26, a second connecting end 28, a third connecting end 30, and a fourth connecting end 68 attached to the body 22. The second and third connecting ends 28 and 30 are attached to the body 22 at a connecting area 46. As shown in FIG. 7, alternative connecting fittings 71 are present on both the second connecting end 28 and third connecting end 30 and defined interior passageways 72 and 74. An alternative body connection 73 is part of the body 22 and used to connect the alternative connection fittings 71 to the body 22.

Figure 8:
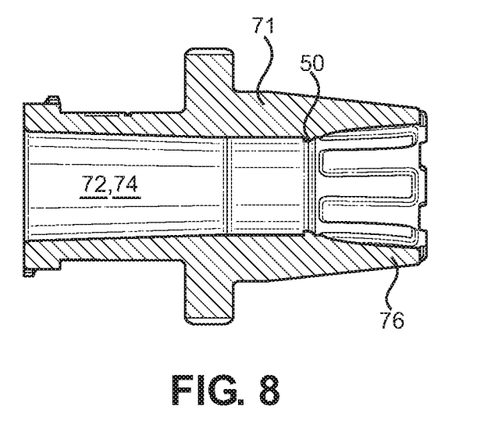
FIG. 8 is a cross-sectional view of a portion of a connector in accordance with yet another embodiment.

FIG. 8 is a cross-sectional view of the alternative connection fittings of FIGS. 6 and 7. The alternative connection fittings 71 define the interior passageway 72 or 74 and defies a retention projection 50. A flared area 76 is also defined and dimensioned to receive the alternative body connection shown in FIGS. 7, 9, and 10.

Figure 9:
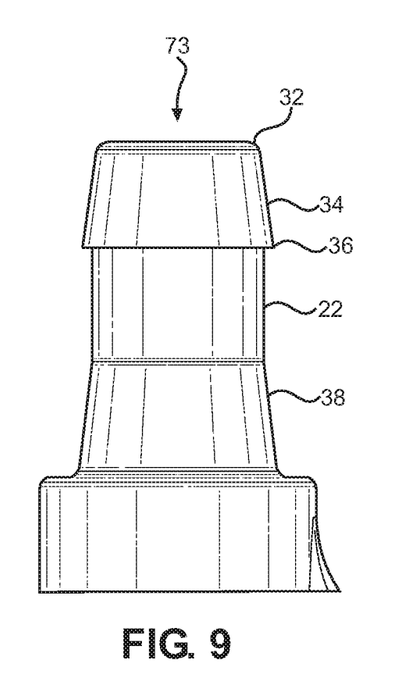
FIG. 9 is a portion of a connector used in conjunction with a portion of the connector shown in FIG. 8.

FIG. 9 illustrates the alternative body connection 73 portion of the body 22 portion of the connector 20. The alternative body connection 73 includes a chamfer, inclined, or curved surface 32, a first inclined surface 34 and retaining barb 36. A second inclined surface 38 is also present on the alternative body connection 73. A stop surface 80 is also located on the alternative body connection 73.

Figure 10:
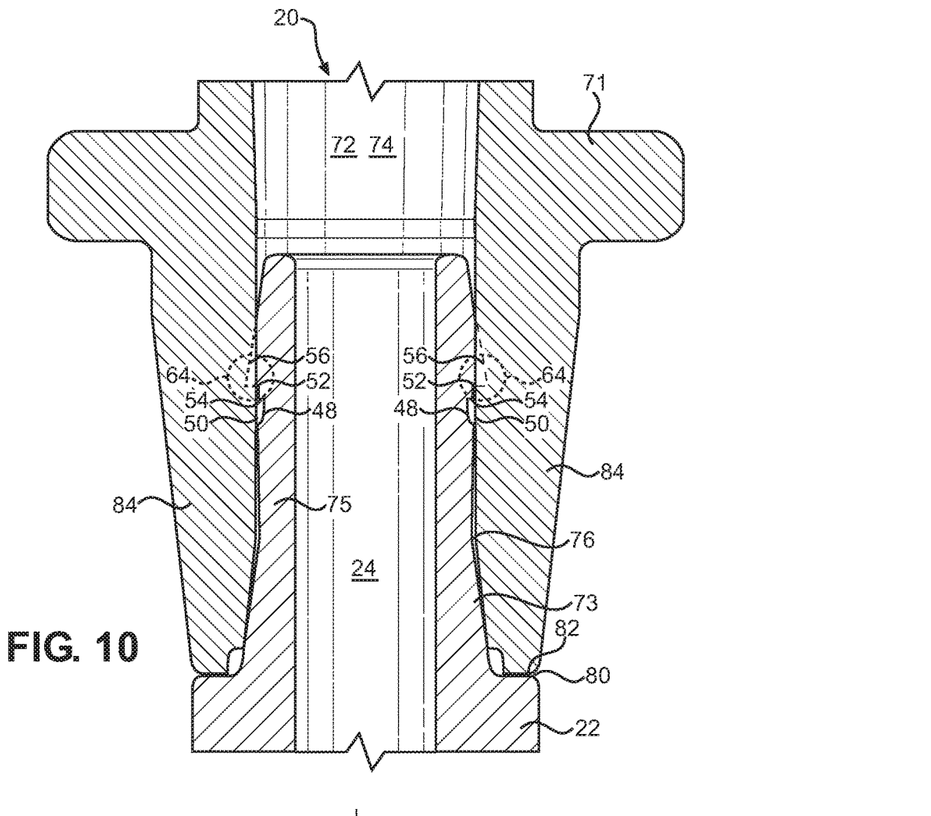
FIG. 10 is an enlarged, partial, cross-sectional view of the connector portions shown in FIGS. 8 and 9 in a connecting attitude.

FIG. 10 illustrates the alternative connecting fittings 71 mounted onto the alternative body connection 73 of the body 22. Because the alternative connection fittings 71 are used on both of the second connecting end 28 and third connecting end 30, only one alternative connecting fitting 71 and alternative body connection 73 will be described in detail because whether they are mounted on the second connecting end 28 or third connecting end 30 they are the same. The interior passageways 72, 74 provide fluid communication to the first interior passageway 24 in the body 22.

The alternative connecting fitting 71 fits over the alternative body connection 73 by the flared area 76 sliding over the cone-shaped portion 75 of the alternative body connection 73. The cone-shaped portion 75 may flex inwardly and the flared area 76 may flex outwardly as the alternative connection fittings 71 is moving toward the alternative body connection 73. The alternative connecting fitting 71 moves towards the alternative body connection 73 until the connecting end fittings stop surface 82 meets the stop surface 80 on the body 22. The connector 20 is dimensioned and sized so that when the connecting end fittings stop surface 82 meets the stop surface 80, the retention projection 50 of the alternative connecting fitting 71 fits into the retention groove 48 of the alternative body connection 73. The cone-shaped portion 75 may snap outwardly and/or the flared area 76 may snap inwardly as the retention projection 50 enters the retention groove 48. The side wall 54 of the retention projection 50 will meet with the side wall 52 of the retention groove 48. The sealing barb 56 will extend outwardly and embed itself into the alternative connection fitting 71 at the interference area 64. In the interference area 64 the sealing barb 56 will expand into the side wall 84 of the alternative connection fitting 71 thereby creating a fluid tight seal between the interior passageways 72, 74 of the alternative connection fitting 71 and the first interior passageway 24 of the body 22. The alternative connection fitting 71 is free to rotate axially about the alternative body connection 73.

Figure 11:
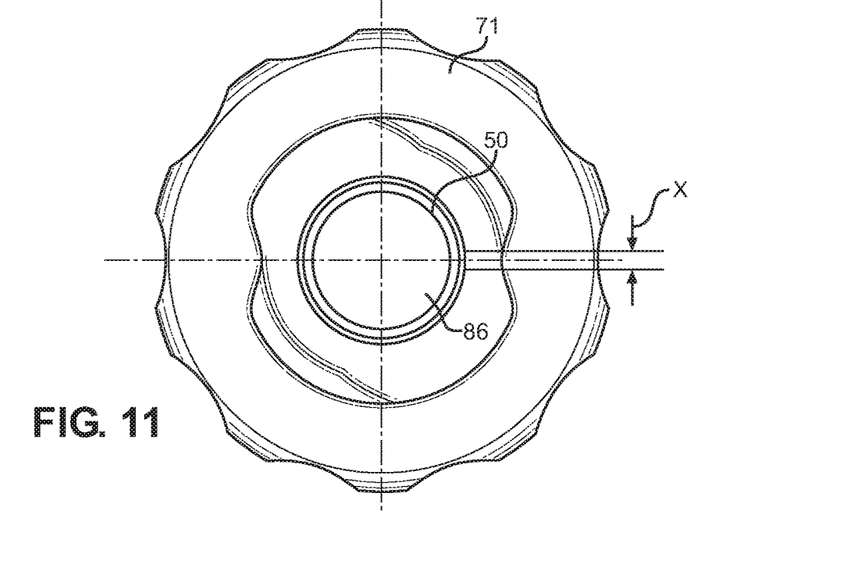
FIG. 11 is a cross-sectional view of a connector in accordance with an embodiment.

In some embodiments, the retention projection 50 may not be contiguous but rather may be in an interrupted shape or, in other words, the shape of an interrupted annulus. FIG. 11 is a cross-sectional view of the alternative connection fitting 71 showing the retention projection 50 having interruptions 86. In some embodiments, the interruptions may have various dimensions X. For example, in some embodiments, the distance X may be 0.02 of an inch. In other embodiments other dimensions for X may be used. It will be appreciated that even though the retention projection 50 has interruptions 86, this in no way prohibits rotation of the retention projection 50 within the retention groove 48.

While the structure described in the connecting area 46 has been described as part of a connector 20, it will be appreciated that the structure forming the connecting area 46 in order to allow a structure to be rotatably connected to a body is not limited to connectors but may be used in a variety of settings in accordance with the present disclosure.

The many features and advantages of the connector are apparent from the detailed description, and thus, it is intended by the appended claims to cover all such features and advantages of the connector. Further, since numerous modifications and variations will readily occur to those skilled in the art, it is not desired to limit the connector to the exact construction and operation illustrated and described, and accordingly, all suitable modifications and equivalents may be resorted to, falling within the scope of the connector.

What is claimed is:

1. A connector, comprising:
   a body defining a first internal passage and comprising a first connecting end configured to receive a first conduit; and
   a connecting end defining a second internal passage, the connecting end rotatably connected to the body such that the second internal passage is fluidly connected with the first internal passage, the connecting end comprising a second connecting end configured to receive a second conduit, wherein:
   a retention groove is defined by either the body or the connecting end,
   a retention projection is defined by the other of the body or the connecting end that does not define the retention groove, the retention projection fitting within the retention groove to connect the connecting end with the body;
   a sealing barb is located on either the body or the connecting end;
   the sealing barb defines an inner edge that faces towards the retention groove and a tapered edge that tapers inwardly as it extends from the inner edge; and
   the sealing barb is dimensioned so that the first internal passage and the second internal passage are fluidly sealed by the sealing barb being embedded in the other of the body and the connecting end on which the sealing barb is not located without use of an elastomeric seal.

2. The connector of claim 1, wherein the body and the connecting end are made of a resilient material and the retention projection is inserted into the retention groove by a snap fit.

3. The connector of claim 1, wherein the retention groove is located on the connecting end and the retention projection is located on the body.

4. The connector of claim 1, wherein the sealing barb is located on the connecting end.

5. The connector of claim 1, wherein the retention groove is annular in shape.

6. The connector of claim 5, wherein the retention projection has an interrupted annulus shape.

7. The connector of claim 1, further comprising a stop surface located on one of the body and connecting end, the stop surface being dimensioned to stop the body and the connecting end from moving closer with respect to each other when the retention projection is located in the retention groove.

8. The connector of claim 1, wherein the sealing barb, when embedded in the other of the body and connecting end on which the sealing barb is not located, is proximate to an undercut or chamfered surface located on the other of the body and connecting end on which the sealing barb is not located.

9. The connector of claim 1, wherein the sealing barb defines at least a portion of the retention groove.

10. The connector of claim 1, wherein the first connecting end defines a first barb configured to retain the first conduit and the second connecting end defines a second barb configured to retain the second conduit.

11. The connector of claim 1, further comprising:
    a first stop surface located on the body; and
    a second stop surface located on the connecting end.

12. The connector of claim 1, wherein the first internal passage is angled relative to the second internal passage.

13. The connector of claim 1, wherein the body is a first body, and the connecting end is part of a second body that is rotatably connected to the first body.

14. The connector of claim 1, wherein a central axis of the first internal passage is at a non-zero angle relative to a central axis of the second internal passage.

15. The connector of claim 1, wherein both the retention groove and the sealing barb are defined by one of the body and the connecting end, and the sealing barb is disposed on the one of the body and the connecting end at a location that is outwardly spaced from the retention groove.

16. The connector of claim 1, wherein the tapered edge extends from the inner edge at an acute angle.

17. A connector, comprising:
    a body defining a first internal passage and comprising a first connecting end configured to receive a first conduit; and
    a connecting end defining a second internal passage, the connecting end rotatably connected to the body such that the second internal passage is fluidly connected with the first internal passage, the connecting end comprising a second connecting end configured to receive a second conduit, wherein:
    a retention groove is defined by either the body or the connecting end,
    a retention projection is defined by the other of the body or the connecting end that does not define the retention groove, the retention projection fitting within the retention groove to connect the connecting end with the body;
    a sealing barb is located on either the body or the connecting end;
    the sealing barb is dimensioned so that the first internal passage and the second internal passage are fluidly sealed by the sealing barb being embedded in the other of the body and the connecting end on which the sealing barb is not located without use of an elastomeric seal; and
    the body and the connecting end are made of a resilient material and the retention projection is inserted into the retention groove by a snap fit.

18. The connector of claim 17, wherein the first connecting end defines a first barb configured to retain the first conduit and the second connecting end defines a second barb configured to retain the second conduit.

19. A connector, comprising:
    a body defining a first internal passage and comprising a first connecting end configured to receive a first conduit, the first connecting end defining a first barb configured to retain the first conduit; and
    a connecting end defining a second internal passage, the connecting end rotatably connected to the body such that the second internal passage is fluidly connected with the first internal passage, the connecting end comprising a second connecting end configured to receive a second conduit, the second connecting end defining a second barb configured to retain the second conduit, wherein:
- a retention groove is defined by either the body or the connecting end,
- a retention projection is defined by the other of the body or the connecting end that does not define the retention groove, the retention projection fitting within the retention groove to connect the connecting end with the body;
- a sealing barb is located on either the body or the connecting end;
- the sealing barb is dimensioned so that the first internal passage and the second internal passage are fluidly sealed by the sealing barb being embedded in the other of the body and the connecting end on which the sealing barb is not located without use of an elastomeric seal.

20. The connector of claim 19, wherein the first internal passage is angled relative to the second internal passage.

\* \* \* \* \*